US012264689B1

(12) United States Patent
Zhu

(10) Patent No.: US 12,264,689 B1
(45) Date of Patent: Apr. 1, 2025

(54) PORTABLE FAN

(71) Applicant: Guangdong Aoyun Technology Co., Ltd., Guangdong (CN)

(72) Inventor: Xueping Zhu, Guangdong (CN)

( * ) Notice: Subject to any disclaimer, the term of this patent is extended or adjusted under 35 U.S.C. 154(b) by 0 days.

(21) Appl. No.: 18/420,163

(22) Filed: Jan. 23, 2024

(30) Foreign Application Priority Data

Jan. 16, 2024 (CN) ........................ 202420112927.3

(51) Int. Cl.

| | |
|---|---|
| ***F04D 29/64*** | (2006.01) |
| ***F04D 19/00*** | (2006.01) |
| ***F04D 25/06*** | (2006.01) |
| ***F04D 25/08*** | (2006.01) |
| ***F04D 29/52*** | (2006.01) |
| ***F21V 33/00*** | (2006.01) |
| ***F21Y 115/10*** | (2016.01) |

(52) U.S. Cl.
CPC ......... *F04D 29/646* (2013.01); *F04D 19/002* (2013.01); *F04D 25/0673* (2013.01); *F04D 25/08* (2013.01); *F04D 29/522* (2013.01); *F21V 33/0096* (2013.01); *F21Y 2115/10* (2016.08)

(58) Field of Classification Search
CPC .. F04D 29/646; F04D 19/002; F04D 25/0673; F04D 29/522; F04D 29/644; F04D 25/0606; F04D 29/52; F04D 25/08; F04D 25/084; F21V 33/0096; F21Y 2115/10
See application file for complete search history.

(56) References Cited

U.S. PATENT DOCUMENTS

| | | | | |
|---|---|---|---|---|
| 8,807,814 | B1 * | 8/2014 | Glenn | F21V 21/0885 362/580 |
| 2006/0073040 | A1 * | 4/2006 | Metzger | F04D 29/281 417/423.1 |
| 2008/0226476 | A1 * | 9/2008 | Lau | F04D 25/084 417/411 |
| 2009/0038108 | A1 * | 2/2009 | Shaanan | A47L 5/14 15/246 |
| 2020/0248700 | A1 * | 8/2020 | Potratz | F04D 29/281 |
| 2020/0309152 | A1 * | 10/2020 | Sanford | F04D 29/601 |
| 2023/0337600 | A1 * | 10/2023 | Naka | F04D 25/082 |
| 2023/0349391 | A1 * | 11/2023 | Rao | F04D 29/522 |

* cited by examiner

*Primary Examiner* — Bryan M Lettman

(57) ABSTRACT

A portable fan includes a housing, an air blowing assembly, a power supply assembly and a mounting shell. The housing is provided with a first air inlet, an air outlet and a first air guide chamber. The air blowing assembly is configured to drive an air flow to flow from the first air inlet to the air outlet. The power supply assembly is electrically connected to the air blowing assembly to supply power to the air blowing assembly. The mounting shell is connected to the housing. The mounting shell includes a first mounting part and a second mounting part. The first mounting part is integrally formed with the second mounting part. The first mounting part is configured to mount the air blowing assembly and the second mounting part is configured to mount the power supply assembly.

19 Claims, 5 Drawing Sheets

PORTABLE FAN

CROSS-REFERENCE TO RELATED APPLICATIONS

The application claims priority of Chinese patent application CN202420112927.3, filed on Jan. 16, 2024, which is incorporated herein by reference in its entireties.

TECHNICAL FIELD

The present disclosure relates to the field of fans, and in particular, to a portable fan.

BACKGROUND

A fan is a household appliance that uses a motor to drive a fan blade to rotate to accelerate air circulation. The fan is mainly used for cooling and air circulation, and is widely used in places such as homes, classrooms, offices, shops, hospitals, and hotels. Traditional fans have a large volume and are inconvenient to carry. With the advancement of science, improved fans have smaller and smaller volumes. However, portable fans on the market still have shortcomings. For example, people cannot hold the fans at all times when working outdoors, which means that people cannot use the fans to blow air for cooling while working. Therefore, there is an urgent need for a portable fan on the market, which can free the hands during air blowing for cooling to bring users a more convenient and comfortable experience.

SUMMARY

In order to overcome the shortcomings in the prior art, the present disclosure provides a portable fan, which can free the hands while blowing air for cooling and is conveniently carried by a user.

The technical solution adopted by the present disclosure to solve the technical problem is as follows.

The present disclosure provides a portable fan, including:

- a housing, wherein the housing is provided with a first air inlet, an air outlet, and a first air guide chamber; the first air inlet, the first air guide chamber, and the air outlet are communicated to each other in sequence;
- an air blowing assembly, wherein the air blowing assembly is configured to drive an air flow to flow from the first air inlet to the air outlet;
- a power supply assembly, wherein the power supply assembly is electrically connected to the air blowing assembly to supply power to the air blowing assembly; and
- a mounting shell, wherein the mounting shell is connected to the housing; the mounting shell includes a first mounting part and a second mounting part; the first mounting part is integrally formed with the second mounting part; the first mounting part is configured to mount the air blowing assembly; and the second mounting part is configured to mount the power supply assembly.

As the improvement of the present disclosure, the portable fan further includes a lighting device, wherein the power supply assembly is electrically connected to the lighting device to supply power to the lighting device.

As the improvement of the present disclosure, the lighting device includes a light-emitting diode (LED) lamp, and a mounting slot is arranged at an upper end of the mounting shell; and the LED lamp is located inside the mounting slot.

As the improvement of the present disclosure, an upper end of the first mounting part is provided with an air outlet hood; the air outlet hood is connected to an upper end of the housing; the air outlet hood is provided with several air outlet holes; and the air outlet holes are communicated to the air outlet.

As the improvement of the present disclosure, the first mounting part is provided with a second air guide chamber and a second air inlet; and the second air inlet, the second air guide chamber, and the air outlet holes are communicated to each other in sequence.

As the improvement of the present disclosure, the air blowing assembly is arranged inside the second air guide chamber; the air blowing assembly is configured to drive air to pass through the first air inlet, the first air guide chamber, the second air inlet, the second air guide chamber, and the air outlet holes in sequence to form a blowing air flow.

As the improvement of the present disclosure, the air blowing assembly includes a motor and a fan blade; the motor has an output shaft; and the fan blade sleeves the output shaft.

As the improvement of the present disclosure, the portable fan further includes an air inlet hood, wherein the air inlet hood is connected to a lower end of the housing; the air inlet hood is provided with several air inlet holes; and the air inlet holes are communicated to the first air inlet.

As the improvement of the present disclosure, a spacer device is arranged between the first mounting part and the second mounting part, and the spacer device is composed of several uniformly distributed partition plates.

As the improvement of the present disclosure, the second mounting part is provided with a mounting chamber; the power supply assembly includes a circuit board and a battery; the circuit board is electrically connected to the battery; and both the circuit board and the battery are arranged in the mounting chamber.

As the improvement of the present disclosure, an upper part of the housing is provided with a clamping slot; the first mounting part is provided with a limiting protrusion; and the limiting protrusion presses against the clamping slot, so that the mounting shell is partially located inside the first air guide chamber.

As the improvement of the present disclosure, the housing includes a front panel, a rear panel opposite to the front panel, and a left panel and a right panel which are connected to the front panel and the rear panel; and the front panel, the rear panel, the left panel, and the right panel are encircled to form the first air guide chamber.

As the improvement of the present disclosure, the first mounting part is connected to a first clamping device; and the first clamping device is configured to clamp the portable fan onto clothes of a user.

As the improvement of the present disclosure, the first clamping device is a first clip; and the first clip presses against the front panel to form a first clamping space between the first clip and the front panel.

As the improvement of the present disclosure, the air inlet hood is connected to a second clamping device; and the second clamping device is configured to clamp the portable fan onto clothes of a user.

As the improvement of the present disclosure, the second clamping device is a second clip; and the second clip presses against the rear panel to form a second clamping space between the second clip and the rear panel.

As the improvement of the present disclosure, a surface of the housing is further provided with a first hook and a second hook; a first hook hole is formed between the first hook and the left panel; and a second hook hole is formed between the second hook and the right panel.

As the improvement of the present disclosure, the housing is further provided with an on/off button; the on/off button is electrically connected to the air blowing assembly and the power supply assembly; the air inlet hood is connected to a button mounting part; the button mounting part is provided with a button mounting hole; the on/off button is located at the button mounting hole; the lower end of the housing is provided with a first mounting port, an inwards protruding button mounting slot, and a second mounting port; the button mounting part is clamped into the button mounting slot; the first mounting port, the button mounting hole, the button mounting slot, and the second mounting port are communicated to each other in sequence; and the on/off button is further provided with a fan gear indicator lamp and a charging indicator lamp.

As the improvement of the present disclosure, the air inlet hood is provided with a charging interface for charging the battery, and the charging interface includes a direct current (DC) charging interface or a Type-C charging interface.

As the improvement of the present disclosure, the mounting shell is connected to the housing through a buckle; the air inlet hood is connected to the housing through a buckle; and an outer wall of the housing is provided with several anti-slip convex bars.

The present disclosure has the following beneficial effects. The present disclosure provides a portable fan includes a housing, wherein the housing is provided with a first air inlet, an air outlet, and a first air guide chamber; the first air inlet, the first air guide chamber, and the air outlet are communicated to each other in sequence; an air blowing assembly, wherein the air blowing assembly is configured to drive an air flow to flow from the first air inlet to the air outlet; a power supply assembly, wherein the power supply assembly is electrically connected to the air blowing assembly to supply power to the air blowing assembly; and a mounting shell, wherein the mounting shell is connected to the housing; the mounting shell includes a first mounting part and a second mounting part; the first mounting part is integrally formed with the second mounting part; the first mounting part is configured to mount the air blowing assembly; and the second mounting part is configured to mount the power supply assembly. Through the above structure, when a user turns on the fan, with the support of the power of the power supply assembly, the air blowing assembly extracts air from the first air inlet and blows the air to a human body through the first air guide chamber and the air outlet. This design is simple and efficient and can improve the air blowing efficiency. Moreover, due to an integrated design of the mounting shell for mounting the power supply assembly and the air blowing assembly, the internal structure of the fan is stable. This greatly reduces the manufacturing cost during manufacturing and production and can achieve mass production of the portable fan, and the production efficiency is greatly improved.

BRIEF DESCRIPTION OF THE DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
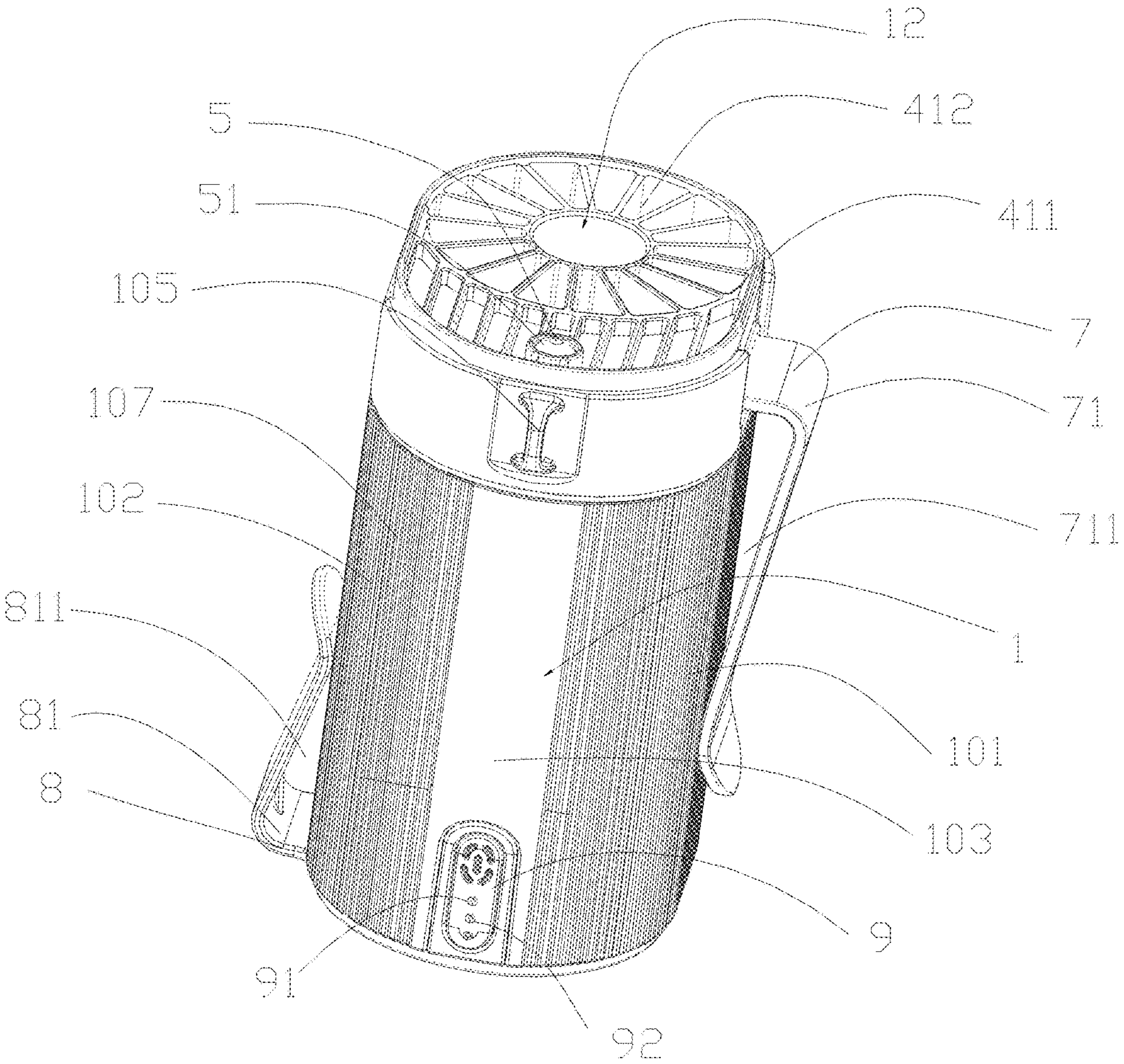
FIG. 1 is a schematic diagram of an entire structure of the present disclosure.
Figure 2:
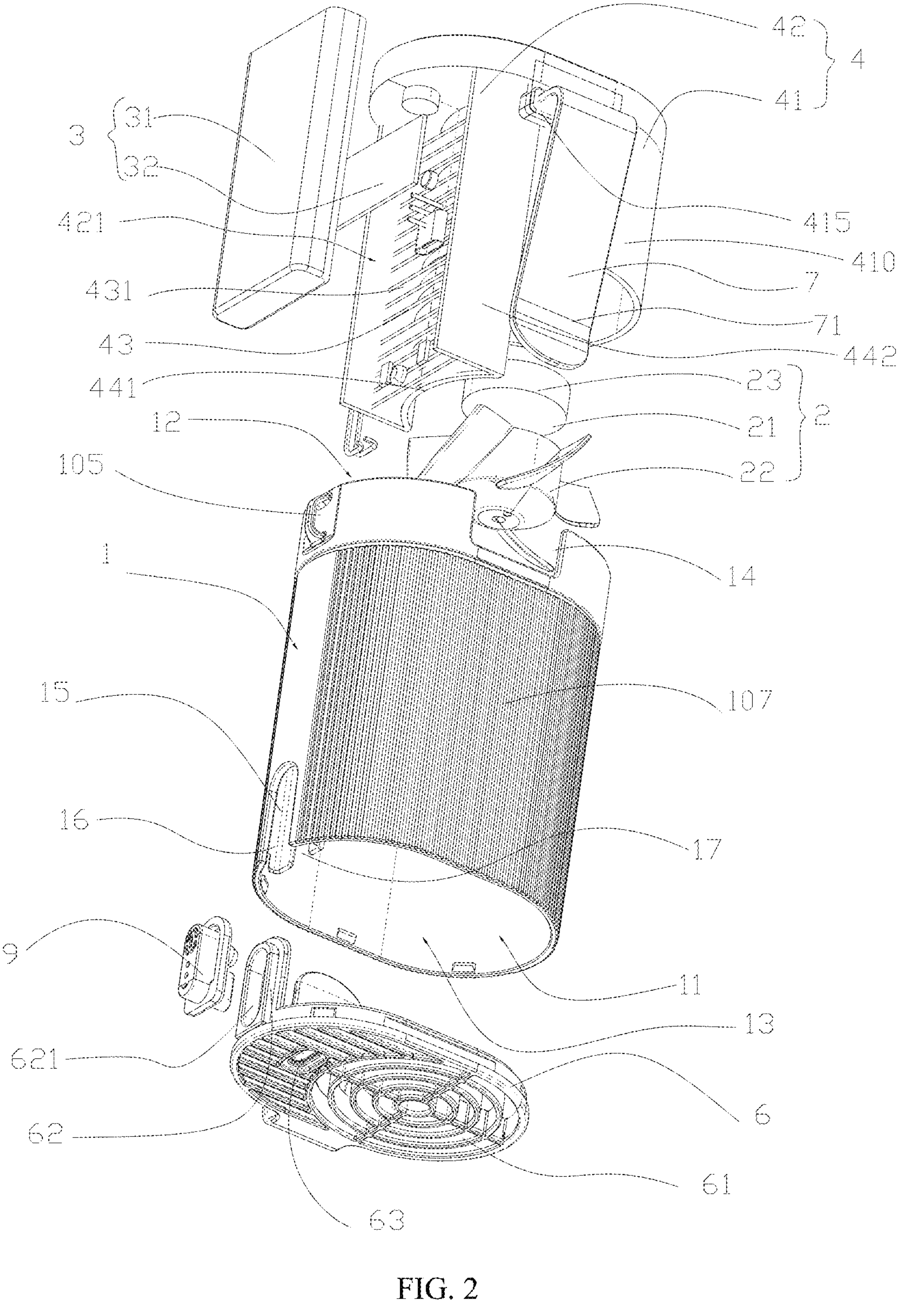
FIG. 2 is an exploded view of the present disclosure.
Figure 3:
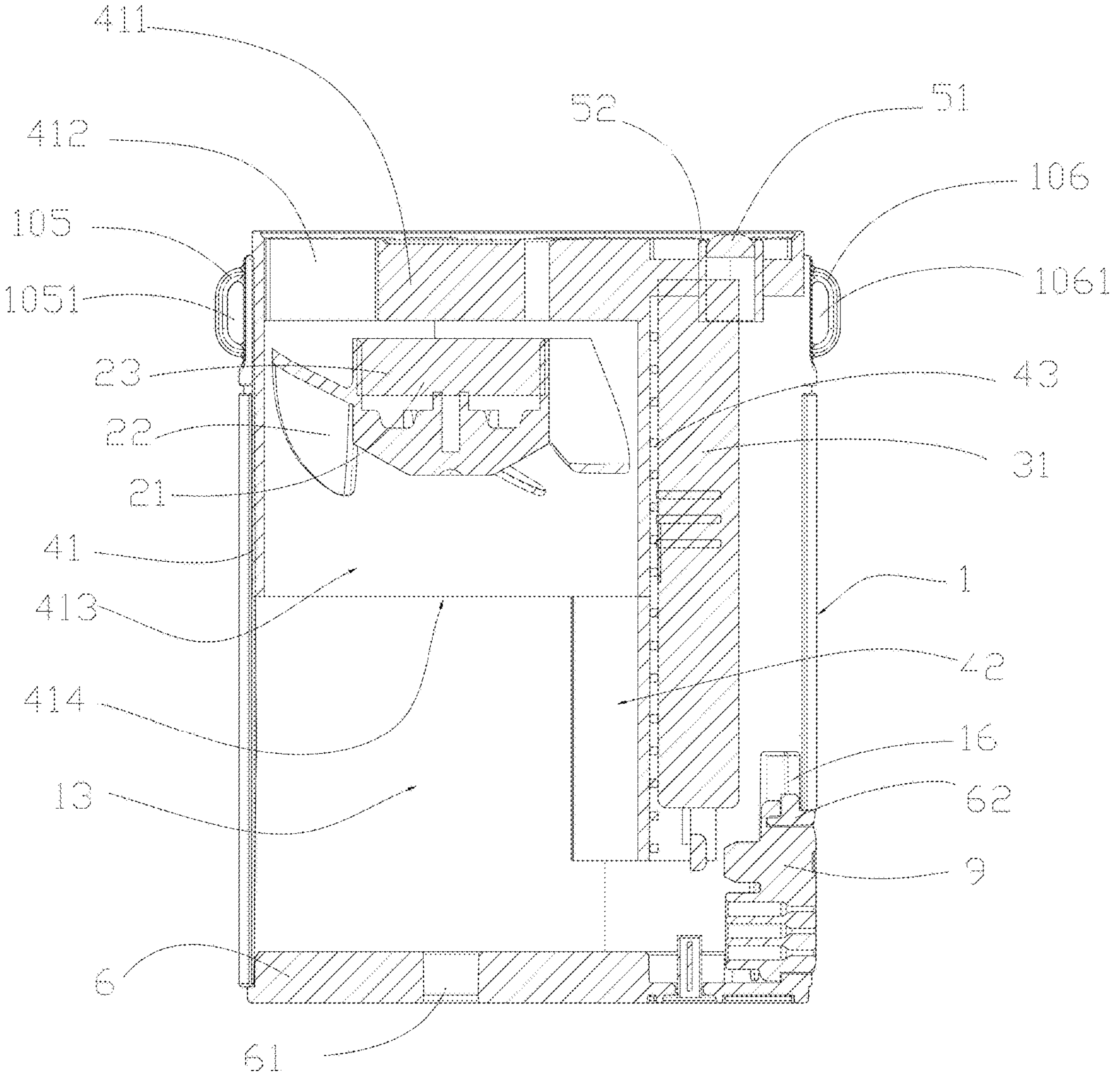
FIG. 3 is cross-sectional view of the present disclosure.
Figure 4:
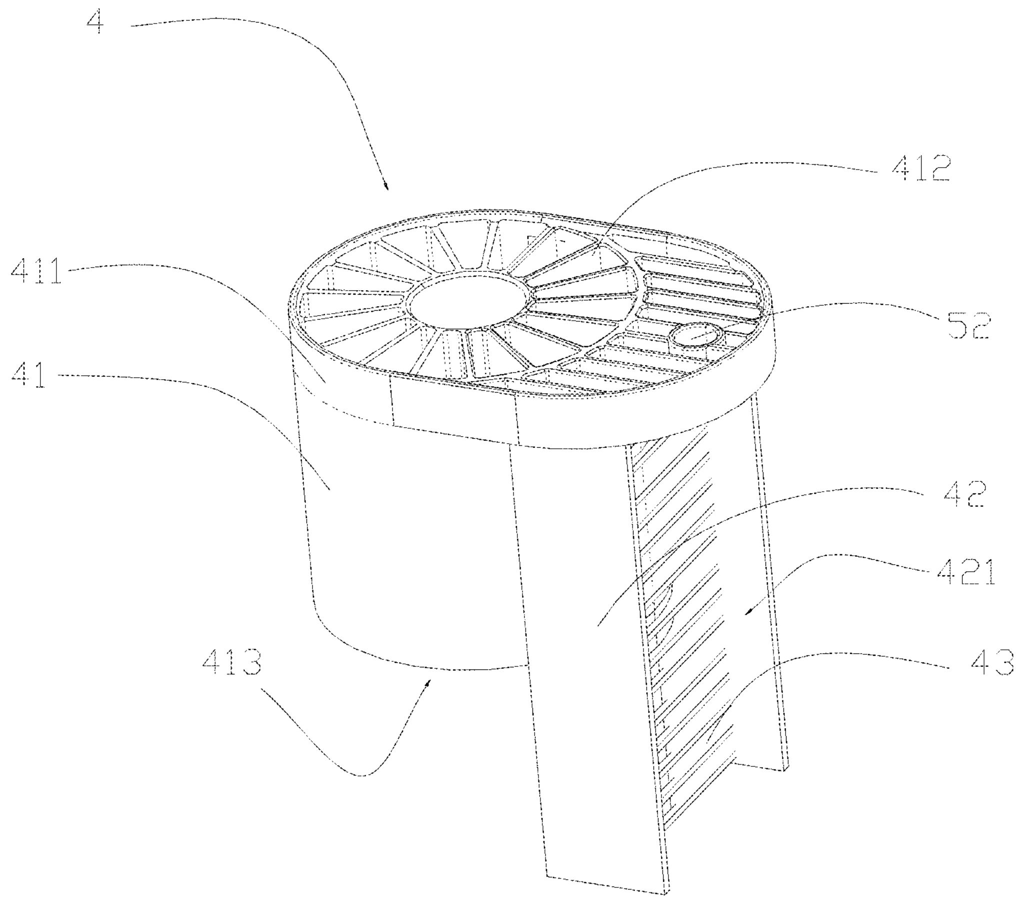
FIG. 4 is a schematic diagram of a mounting shell of the present disclosure.
Figure 5:
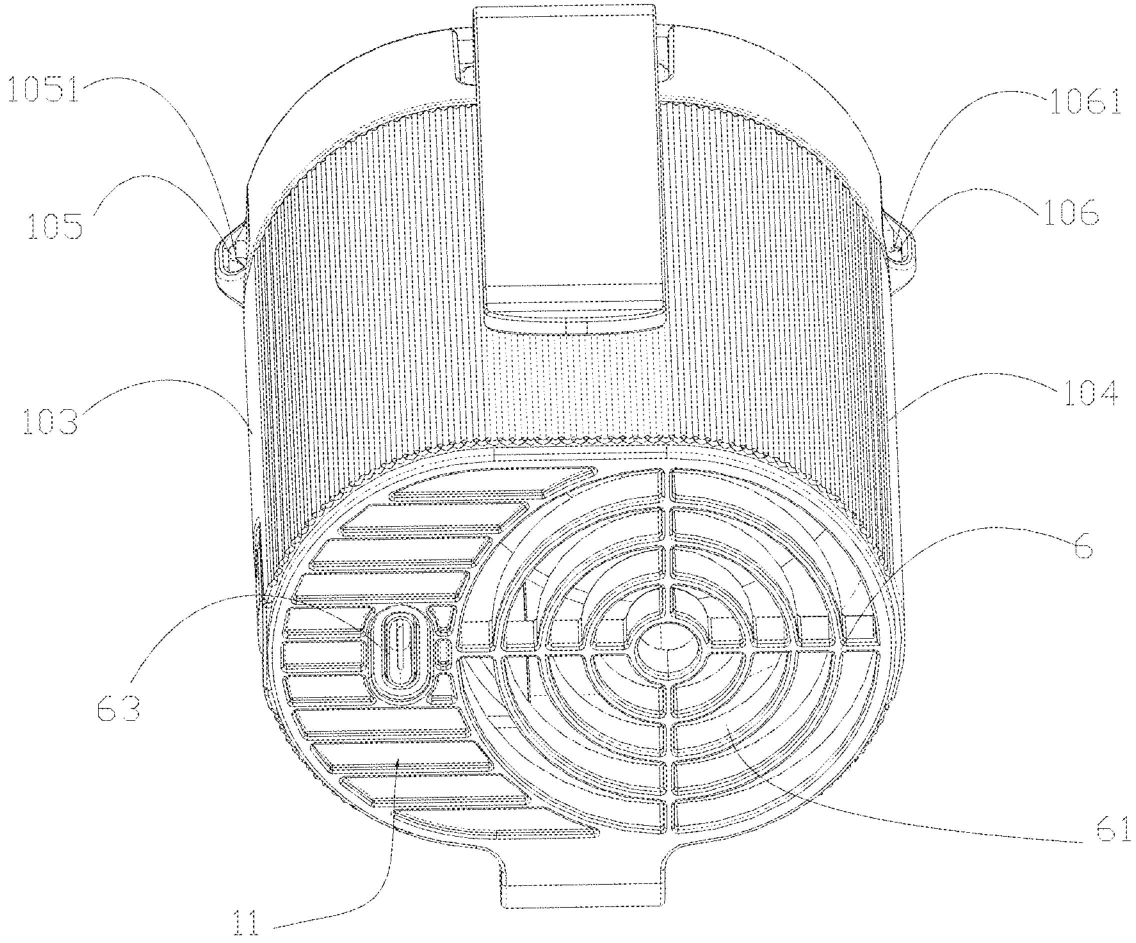
FIG. 5 is a schematic diagram of another entire structure of the present disclosure.

Referring to FIG. 1 to FIG. 5, a portable fan includes a housing 1, wherein the housing 1 is provided with a first air inlet 11, an air outlet 12, and a first air guide chamber 13; the first air inlet 11, the first air guide chamber 13, and the air outlet 12 are communicated to each other in sequence; an air blowing assembly 2, wherein the air blowing assembly 2 is configured to drive an air flow to flow from the first air inlet 11 to the air outlet 12; a power supply assembly 3, wherein the power supply assembly 3 is electrically connected to the air blowing assembly 2 to supply power to the air blowing assembly 2; and a mounting shell 4, wherein the mounting shell 4 is connected to the housing 1; the mounting shell 4 includes a first mounting part 41 and a second mounting part 42; the first mounting part 41 is integrally formed with the second mounting part 42; the first mounting part 41 is configured to mount the air blowing assembly 2; and the second mounting part 42 is configured to mount the power supply assembly 3. Through the above structure, when a user turns on the fan, with the support of the power of the power supply assembly 3, the air blowing assembly 2 extracts air from the first air inlet 11 and blows the air to a human body through the first air guide chamber 13 and the air outlet 12. This design is simple and efficient and can improve the air blowing efficiency. Moreover, due to an integrated design of the mounting shell 4 for mounting the power supply assembly 3 and the air blowing assembly 2, the internal structure of the fan is stable. This greatly reduces the manufacturing cost during manufacturing and production and can achieve mass production of the portable fan, and the production efficiency is greatly improved.

In this implementation, the portable fan further includes a lighting device 5. The power supply assembly 3 is electrically connected to the lighting device 5 to supply power to the lighting device 5. Specifically, the lighting device 5 includes an LED lamp 51, and a mounting slot 52 is arranged at an upper end of the mounting shell 4; and the LED lamp 51 is located inside the mounting slot 52. Through the above structure, the portable fan has a lighting function. The user can enjoy both the air blowing function and the lighting function of the fan when working outside at hot summer night. The LED lamp is used for lighting when the user searches for items or in an emergency situation, thereby improving the multifunctionality of the portable fan and improving the user experience.

In this implementation, an upper end of the first mounting part 41 is provided with an air outlet hood 411; the air outlet hood 411 is connected to an upper end of the housing 1; the air outlet hood 411 is provided with several air outlet holes 412; and the air outlet holes 412 are communicated to the air outlet 12. Further, the first mounting part 41 is provided with a second air guide chamber 413 and a second air inlet 414;

and the second air inlet 414, the second air guide chamber 413, and the air outlet holes 412 are communicated to each other in sequence. Specifically, the air blowing assembly 2 is arranged inside the second air guide chamber 413; the air blowing assembly 2 is configured to drive air to pass through the first air inlet 11, the first air guide chamber 13, the second air inlet 414, the second air guide chamber 413, and the air outlet holes 412 in sequence to form a blowing air flow. Through the above structure, it is effectively achieved that the air blowing assembly 2 drives the air to enter from the first air inlet 11 of the housing 1 and then the second air inlet 414 of the first mounting part 41 through the first air guide chamber 13 of the housing 1, and the air is finally blown out of the housing 1 through the air outlet holes 412 and the air outlet 12 via the second air guide chamber 413. This design makes the air inlet and the air outlet in the same direction, greatly improves the air blowing efficiency of the fan, and improves the usability of the portable fan.

In this implementation, the air blowing assembly 2 includes a motor 21 and a fan blade 22; the motor 21 has an output shaft 23; and the fan blade 22 sleeves the output shaft 23. Through the above structure, the motor 21 drives the fan blade 22 to rotate, and the output shaft 23 drives the fan blade 22 to extract the air and blow the air to the human body, which effectively achieves the air blowing function of the fan and improves the air blowing efficiency.

In this implementation, the portable fan further includes an air inlet hood 6, wherein the air inlet hood 6 is connected to a lower end of the housing 1; the air inlet hood 6 is provided with several air inlet holes 61; and the air inlet holes 61 are communicated to the first air inlet 11. Through the above structure, the design of the air inlet hood 6 is conducive to preventing other debris, such as hairs and paper scraps, from being sucked into the fan, which is conducive to maintaining the safety of the fan.

In this implementation, a spacer device 43 is arranged between the first mounting part 41 and the second mounting part 42, and the spacer device 43 is composed of several uniformly distributed partition plates 431. Through the above structure, due to the arrangement of the several uniformly distributed partition plates 431, and due to the fact that the first mounting part 41 is provided with the air blowing assembly 2 and the second mounting part 42 is provided with the power supply assembly 3, there is a certain space between the air blowing assembly 2 and the power supply assembly 3, which can prevent heat generated by the battery in the power supply assembly 3 from affecting the air blowing assembly 2 and help to prolong the service life of the fan.

In this implementation, the second mounting part 42 is provided with a mounting chamber 421; the power supply assembly 3 includes a circuit board 31 and a battery 32; the circuit board 31 is electrically connected to the battery 32; and both the circuit board 31 and the battery 32 are arranged in the mounting chamber 421. Through the above structure, since both the circuit board 31 and the battery 32 are arranged in the mounting chamber 421, it is beneficial for making the structure compact, reducing a mounting space and the production cost, and facilitating the user to carry the portable fan. In particular, the spacer device 43 comprises an annular plate 441 and two side plates 442, the annular plate 441 projects toward the power supply assembly 3, and the annular plate 441 and the two side plates 442 cooperatively form the mounting chamber 421. In addition, the first mounting part 41 includes an annular sidewall 410, and a height of spacer device 43 along a first direction from the first air inlet 11 to the air outlet 12 is greater than a height of the annular sidewall 410 along the first direction, such that the annular plate 441 and the housing 1 can cooperatively form the first air guide chamber 13.

In this implementation, an upper part of the housing 1 is provided with a clamping slot 14; the first mounting part 41 is provided with a limiting protrusion 415; and the limiting protrusion 415 presses against the clamping slot 14, so that the mounting shell 4 is partially located inside the first air guide chamber 13. Through the above structure, the first mounting part 41 can be clamped and sleeved inside the housing 1, and the air outlet hood 411 can expose the air outlet 12, which is convenient for the fan to blow out the air and improves the user experience.

In this implementation, the housing 1 includes a front panel 101, a rear panel 102 opposite to the front panel 101, and a left panel 103 and a right panel 104 which are connected to the front panel 101 and the rear panel 102; and the front panel 101, the rear panel 102, the left panel 103, and the right panel 104 are encircled to form the first air guide chamber 13.

In this implementation, the first mounting part 41 is connected to a first clamping device 7; and the first clamping device 7 is configured to clamp the portable fan onto clothes of a user. Specifically, the first clamping device 7 is a first clip 71; and the first clip 71 presses against the front panel 101 to form a first clamping space 711 between the first clip 71 and the front panel 101. The first clip 71 can be a metal or plastic clip. Through the above structure, during use, the user can clamp the fan at the waist of pants or a pocket of clothes through the first clip 71, so that the fan blows air into the body of the user. Compared to a traditional small handheld fan, the fan with the clip can free the hands. When working, the user can feel the air blown out from the fan without holding the fan, thus achieving a cool experience. This greatly improves the portability and practicality of the product.

In this implementation, the air inlet hood 6 is connected to a second clamping device 8; and the second clamping device 8 is configured to clamp the portable fan onto clothes of a user. Specifically, the second clamping device 8 is a second clip 81; and the second clip 81 presses against the rear panel 102 to form a second clamping space 811 between the second clip 81 and the rear panel 102. The second clip 81 can be a metal or plastic clip. Through the above structure, during use, after clamping the portable fan to the waist of pants with the first clip 71, the user can clamp the second clip 81 to a hem, thereby achieving an effect of stabilizing the fan. When the user needs to do large body movements due to work, the fan can still be firmly fixed at the waist of the pants, which greatly ensures the stability of the fan.

In this implementation, a surface of the housing 1 is further provided with a first hook 105 and a second hook 106; a first hook hole 1051 is formed between the first hook 105 and the left panel 103; and a second hook hole 1061 is formed between the second hook 106 and the right panel 104. Through the above structure, when it is inconvenient for the user to clamp the fan onto the clothes, the user can thread a rope through the first hook hole 1051 and the second hook hole 1061, and then hang the rope around the neck, so that the fan can be carried without being held by the hands, and the portability of the fan is improved.

In this implementation, the housing 1 is further provided with an on/off button 9; the on/off button 9 is electrically connected to the air blowing assembly 2 and the power supply assembly 3; the air inlet hood 6 is connected to a button mounting part 62; the button mounting part 62 is provided with a button mounting hole 621; the on/off button 9 is located at the button mounting hole 621; the lower end of the housing 1 is provided with a first mounting port 15, an inwards protruding button mounting slot 16, and a second mounting port 17; the button mounting part 62 can be clamped into the button mounting slot 16; the first mounting port 15, the button mounting hole 621, the button mounting slot 16, and the second mounting port 17 are communicated to each other in sequence; and the on/off button 9 is further provided with a fan gear indicator lamp 91 and a charging indicator lamp 92. Through the above structure, the user can press the on/off button 9 to turn on the fan. The fan gear indicator lamp 91 and the charging indicator lamp 92 are included. This design is simple and ingenious, making it convenient for the use to use.

In this implementation, the air inlet hood 6 is provided with a charging interface 63 for charging the battery 32, and the charging interface 63 includes a DC charging interface or a Type-C charging interface. Through the above structure, the DC charging interface or the Type-C charging interface can adapt to requirements of different users for charging interfaces, making it convenient for the user to charge the fan in a timely manner.

In this implementation, the mounting shell 4 is connected to the housing 1 through a buckle; the air inlet hood 6 is connected to the housing 1 through a buckle; and an outer wall of the housing 1 is provided with several anti-slip convex bars 107. Through the above structure, the structure of the fan is mounted more stably and firmly through the buckle connection, so that the quality and safety of the product are improved. Furthermore, the outer wall of the housing 1 of the fan is provided with the several anti-slip convex bars 107, so that a friction force can be increased when the fan is clamped at the waist of the pants, and the fan can be prevented from easily falling off.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A portable fan, comprising:

a housing, wherein the housing is provided with a first air inlet, an air outlet, and a first air guide chamber; the first air inlet, the first air guide chamber, and the air outlet are communicated to each other in sequence;

an air blowing assembly, wherein the air blowing assembly is configured to drive an air flow to flow from the first air inlet to the air outlet;

a power supply assembly, wherein the power supply assembly is electrically connected to the air blowing assembly to supply power to the air blowing assembly; and a mounting shell, wherein the mounting shell is connected to the housing; the mounting shell comprises a first mounting part and a second mounting part; the first mounting part is integrally formed with the second mounting part; the first mounting part is configured to mount the air blowing assembly; and the second mounting part is configured to mount the power supply assembly;

wherein an upper part of the housing is provided with a clamping slot; the first mounting part is provided with a limiting protrusion; and the limiting protrusion presses against the clamping slot, so that the mounting shell is partially located inside the first air guide chamber.

2. The portable fan according to claim 1, further comprising a lighting device, wherein the power supply assembly is electrically connected to the lighting device to supply power to the lighting device.

3. The portable fan according to claim 2, wherein the lighting device comprises a light-emitting diode (LED) lamp, and a mounting slot is arranged at an upper end of the mounting shell; and the LED lamp is located inside the mounting slot.

4. The portable fan according to claim 1, wherein an upper end of the first mounting part is provided with an air outlet hood; the air outlet hood is connected to an upper end of the housing; the air outlet hood is provided with several air outlet holes; and the air outlet holes are communicated to the air outlet.

5. The portable fan according to claim 4, wherein the first mounting part is provided with a second air guide chamber and a second air inlet; and the second air inlet, the second air guide chamber, and the air outlet holes are communicated to each other in sequence.

6. The portable fan according to claim 5, wherein the air blowing assembly is arranged inside the second air guide chamber; the air blowing assembly is configured to drive air to pass through the first air inlet, the first air guide chamber, the second air inlet, the second air guide chamber, and the air outlet holes in sequence to form a blowing air flow.

7. The portable fan according to claim 6, wherein the air blowing assembly comprises a motor and a fan blade; the motor has an output shaft; and the fan blade sleeves the output shaft.

8. The portable fan according to claim 1, wherein a spacer device is arranged between the first mounting part and the second mounting part, and the spacer device is composed of several uniformly distributed partition plates.

9. The portable fan according to claim 1, wherein the second mounting part is provided with a mounting chamber; the power supply assembly comprises a circuit board and a battery; the circuit board is electrically connected to the battery; and both the circuit board and the battery are arranged in the mounting chamber.

10. The portable fan according to claim 1, wherein the housing comprises a front panel, a rear panel opposite to the front panel, and a left panel and a right panel which are connected to the front panel and the rear panel; and the front panel, the rear panel, the left panel, and the right panel are encircled to form the first air guide chamber.

11. The portable fan according to claim 10, wherein the first mounting part is connected to a first clamping device; and the first clamping device is configured to clamp the portable fan onto clothes of a user.

12. The portable fan according to claim 11, wherein the first clamping device is a first clip; and the first clip presses against the front panel to form a first clamping space between the first clip and the front panel.

13. The portable fan according to claim 10, wherein a surface of the housing is further provided with a first hook and a second hook; a first hook hole is formed between the first hook and the left panel; and a second hook hole is formed between the second hook and the right panel.

14. The portable fan according to claim 1, wherein the air inlet hood is connected to a clamping device; and the clamping device is configured to clamp the portable fan onto clothes of a user.

15. The portable fan according to claim 14, wherein the clamping device is a clip; and the clip presses against the rear panel to form a clamping space between the clip and the rear panel.

16. A portable fan, comprising:

a housing, wherein the housing is provided with a first air inlet, an air outlet, and a first air guide chamber; the first air inlet, the first air guide chamber, and the air outlet are communicated to each other in sequence;

an air blowing assembly, wherein the air blowing assembly is configured to drive an air flow to flow from the first air inlet to the air outlet;

a power supply assembly, wherein the power supply assembly is electrically connected to the air blowing assembly to supply power to the air blowing assembly; and a mounting shell, wherein the mounting shell is connected to the housing; the mounting shell comprises a first mounting part and a second mounting part; the first mounting part is integrally formed with the second mounting part; the first mounting part is configured to mount the air blowing assembly; and the second mounting part is configured to mount the power supply assembly; and an air inlet hood, wherein the air inlet hood is connected to a lower end of the housing; the air inlet hood is provided with several air inlet holes; and the air inlet holes are communicated to the first air inlet;

wherein the housing is further provided with an on/off button; the on/off button is electrically connected to the air blowing assembly and the power supply assembly; the air inlet hood is connected to a button mounting part; the button mounting part is provided with a button mounting hole; the on/off button is located at the button mounting hole; the lower end of the housing is provided with a first mounting port, an inwards protruding button mounting slot, and a second mounting port; the button mounting part is clamped into the button mounting slot; the first mounting port, the button mounting hole, the button mounting slot, and the second mounting port are communicated to each other in sequence; and the on/off button is further provided with a fan gear indicator lamp and a charging indicator lamp.

17. The portable fan according to claim 16, wherein the mounting shell is connected to the housing through a first buckle; the air inlet hood is connected to the housing through a second buckle; and an outer wall of the housing is provided with several anti-slip convex bars.

18. A portable fan, comprising:

a housing, wherein the housing is provided with a first air inlet, an air outlet, and a first air guide chamber; the first air inlet, the first air guide chamber, and the air outlet are communicated to each other in sequence;

an air blowing assembly, wherein the air blowing assembly is configured to drive an air flow to flow from the first air inlet to the air outlet;

a power supply assembly, wherein the power supply assembly is electrically connected to the air blowing assembly to supply power to the air blowing assembly; and a mounting shell, wherein the mounting shell is connected to the housing; the mounting shell comprises a first mounting part, a second mounting part and an air outlet hood; the first mounting part is integrally formed with the second mounting part; the first mounting part is configured to mount the air blowing assembly; and the second mounting part is configured to mount the power supply assembly; and wherein the first mounting part comprises an annular sidewall, the annular sidewall forms a second air guide chamber receiving the air blowing assembly, the air outlet hood is disposed at the air outlet and connected to an upper end of the annular sidewall, the second mounting part comprises a spacer device arranged at a side of the annular sidewall, and the power supply assembly is installed on a side of the spacer device away from the annular sidewall, the first mounting part and the second mounting part are arranged in a side by side manner along a second direction perpendicular to a first direction from the first air inlet to the air outlet, wherein a height of the spacer device along the first direction is greater than a height of the annular sidewall along the first direction, wherein the spacer device comprises an annular plate and two side plates, the annular plate and the two side plates cooperatively form a mounting chamber receiving the power supply assembly, and the annular plate and the housing cooperatively form the first air guide chamber, the first air inlet, the first air guide chamber, the second air guide chamber, and the air outlet are arranged along the first direction.

19. The portable fan according to claim 18, further comprising an air inlet hood located at the first air inlet, wherein the air inlet hood comprises a plurality of air inlet holes and a charging interface for charging the power supply assembly.

* * * * *